United States Patent
Harenski et al.

(10) Patent No.: US 6,461,451 B1
(45) Date of Patent: Oct. 8, 2002

(54) TREATMENT OF INGOTS OR SPACER BLOCKS IN STACKED ALUMINUM INGOTS

(75) Inventors: Joseph P. Harenski, Export; Roger W. Kaufold, Pittsburgh, both of PA (US); Brian J. Morrissey, Newburgh, IN (US); Robert L. Shadwick, Jr., East Owensboro, KY (US); Larry F. Wieserman, Apollo, PA (US)

(73) Assignee: Alcoa Inc., Pittsburgh, PA (US)

( * ) Notice: Subject to any disclaimer, the term of this patent is extended or adjusted under 35 U.S.C. 154(b) by 37 days.

(21) Appl. No.: 09/736,594

(22) Filed: Dec. 13, 2000

(51) Int. Cl.$^7$ .............................................. C23C 22/56
(52) U.S. Cl. ...................... 148/275; 148/276; 148/283; 427/180; 427/196
(58) Field of Search .................. 427/180, 196; 148/275, 276, 283; 118/729, 500; 266/257; 432/162; 34/184; 126/339

(56) References Cited

U.S. PATENT DOCUMENTS 2,092,033 A * 9/1937 Stroup .......................... 148/27
2,720,967 A * 10/1955 Wilson ......................... 206/499
3,567,521 A * 3/1971 Toy et al. ..................... 148/283

OTHER PUBLICATIONS

"Krytox® 2000 Dispersions" (http://www.dupont.com/lubricants/58502.htm) (No date).
"Teflon® PFA Fluoropolymer Resin" (http://www.dupont.com/teflon/chemical/pfa.html) (No date).

* cited by examiner

Primary Examiner—John Sheehan
Assistant Examiner—Andrew L. Oltmans
(74) Attorney, Agent, or Firm—Charles Q. Buckwalter; Julie W. Meder; Matthew W. Smith

(57) ABSTRACT

A method of treating a surface of a stacked aluminum alloy ingot during a heating process. Spacer blocks are positioned adjacent aluminum alloy ingots to form a stack, wherein the spacer block has a support surface contacting a contact surface of the aluminum alloy ingot, and at least one of the support surface and the contact surface include a fluorine containing material. The stack is heated to at least a temperature at which the fluorine containing material decomposes or vaporizes such that a layer of a fluorinated oxide compound is formed at the interfaces between the ingots and the spacer blocks.

13 Claims, 2 Drawing Sheets

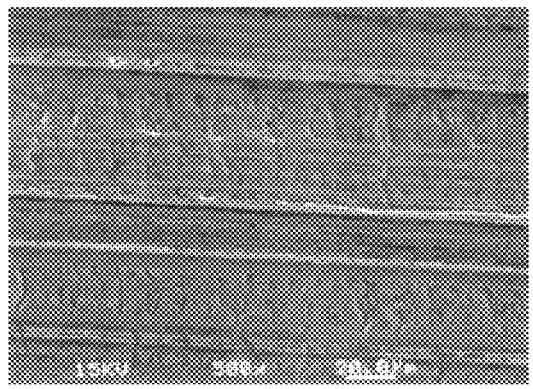
FIG. 1
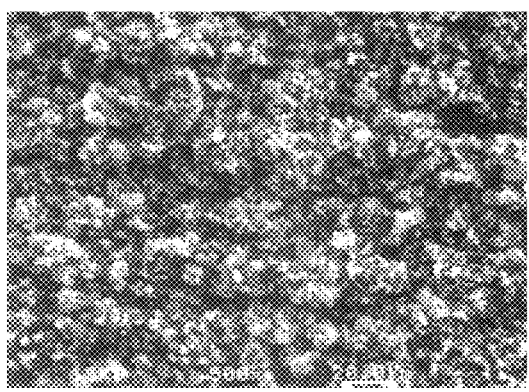 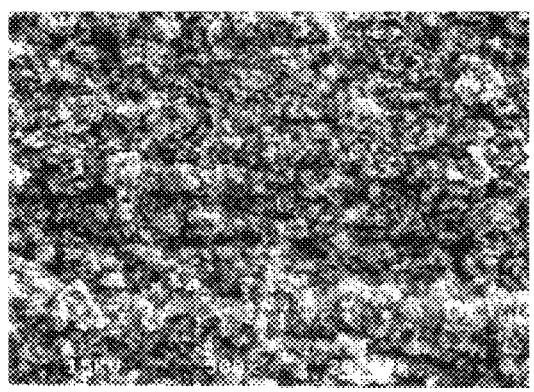
FIG. 2 FIG. 3

TREATMENT OF INGOTS OR SPACER BLOCKS IN STACKED ALUMINUM INGOTS

FIELD OF THE INVENTION

The present invention relates to spacer blocks positioned between aluminum ingots, more particularly, the treatment of aluminum ingots and/or spacer blocks to prevent production of oxide staining and sticking during heating of stacked aluminum ingots.

BACKGROUND OF THE INVENTION

Preheating of aluminum alloy ingots is a well established practice for achieving desired properties in the ingot and to render the ingot sufficiently malleable for reduction and other processes. During the preheating step, aluminum ingots are heated to temperatures below the melting point of the aluminum alloy, e.g., up to about 620° C. At these temperatures, alkali metals and alkaline earth metals (e.g., magnesium) in the aluminum alloy migrate to the surface of the ingot and react with available oxygen to form a layer of an oxide (e.g., magnesium oxide) on the ingot. A magnesium oxide layer has a dark color of brown to gray. When an ingot having this dark surface is subsequently rolled, the dark layer becomes a streak of dark color in the rolled product. For certain applications of the rolled sheet, such dark streaks are unacceptable in the marketplace for cosmetic reasons.

A common method of reducing the production of magnesium oxide is to operate the preheat furnace in an atmosphere of vaporized ammonium fluoroborate. The ammonium fluoroborate reacts with magnesium on the surface of the ingots preferentially over oxygen and also possibly facilitates hydrogen loss from the ingot which would otherwise form bubbles in the ingot. In a pusher furnace in which all surfaces of the ingots therein are exposed to the ammonium fluoroborate atmosphere, the surfaces of the ingot uniformly remain as a shiny silver color. However, many preheat furnaces require that the ingots are stacked within the furnace. In order to expose as much surface area of the stacked ingots as possible to the furnace atmosphere the stacked ingots are spaced apart in a stack by a plurality of spacer blocks. Spacer blocks have been made from aluminum alloys and ceramics such as calcium silicate. Other suitable materials for spacer blocks include titanium alloys, steel alloys, and nickel alloys. Drawbacks to aluminum spacer blocks include their propensity to stick to the ingot undergoing heating, indent the ingot and produce unwanted debris on the ingot. Ceramic spacer blocks avoid these problems associated with aluminum spacer blocks. However, staining of the ingot persists on the surface of the ingot which was in contact with the spacer block during heating. Ceramic spacer blocks prevent the atmosphere of ammonium fluoroborate from reaching the interfaces between the spacer blocks and the ingots. Distinct areas of dark magnesium oxide stain are produced on the ingots at the spacer block interfaces. The stained areas may be removed by scalping the ingot, however, this produces more waste, lowers the recovery values and adds another expensive and time consuming step.

Accordingly, a need remains for a method of preheating stacked aluminum ingots maintained spaced apart from each other by spacer blocks which avoids production of dark stains above and below the spacer blocks.

SUMMARY OF THE INVENTION

This need is met by the method of the present invention of treating a surface of a stacked aluminum alloy ingot during a heating process having the steps of a) positioning a spacer member adjacent an aluminum alloy ingot to form a stack, wherein the spacer member includes a support surface contacting a contact surface of the aluminum alloy ingot, and at least one of the support surface and the contact surface includes a fluorine containing material; and b) heating the stack to at least a temperature at which the fluorine containing material decomposes such that a layer of a fluorinated oxide compound forms on the contact surface. The fluorinated oxide formed on the contact surface preferably is a fluoride and/or oxyfluoride of an alkali metal fluoride and/or an alkaline earth metal. In general, the support surface includes the fluorine containing material but the contact surface of the ingot or both may include the fluorine containing material.

The spacer member may be made from aluminum alloys, ceramics, titanium alloys, steel alloys or nickel alloys or combinations thereof. Preferred materials for the spacer block are ceramics, ceramic composites and metal laminated ceramics.

The fluorine containing material may be an organic or inorganic fluorine containing material. Suitable inorganic fluorine containing materials include aluminum fluoride, aluminum bifluoride, ammonium fluoroborate, ammonium fluoride, calcium fluoride, sodium aluminum fluoride, magnesium fluoride, magnesium hexafluorosilicate, potassium fluoride, sodium fluoride, and sodium hexafluorosilicate. Suitable organic fluorine containing materials include polytetrafluoroethylene, tetrafluoroethylene-hexafluoropropylene, tetrafluoroethylene-perfluoro (alkylvinyl ether), tetrafluoroethylene-ethylene, polyvinylidene fluoride, vinylidene fluoride-hexafluoropropylene, vinylidene fluoride-1-H-pentafluoropropylene, polyvinyl fluoride, tetrafluoroethylene-perfluoroethylene sulfonic acid, fluorinated ethylene propylene (e.g., tetrafluoroethylene-propylene), ethylene-chlorotrifluoroethylene and perfluoroalkoxy copolymers.

The fluorine containing material preferably decomposes or vaporizes at about 200–660° C. and preferably is potassium fluoride or polytetrafluoroethylene. The method of the present invention is particularly suited for treating alloys of the Aluminum Association 1XXX, 2XXX, 3XXX, 4XXX, 5XXX, 6XXX, 7XXX or 8XXX series.

The method further includes an initial step of applying a treating composition including the fluorine containing material onto the support surface or the contact surface by brushing, spraying, dipping, or rolling. The treating composition may further include a solvent, hinder, surfactant or dispersant.

The present invention further includes a spacer member having a support surface for contacting an aluminum ingot, the support surface including a treating composition including a fluorine containing material.

BRIEF DESCRIPTION OF THE DRAWINGS

Other features of the present invention will be further described in the following related description of the preferred embodiments which is to be considered together with the accompanying drawings wherein:

FIG. 1 is a scanning electron micrograph of a sheet of as-rolled 5182 alloy;

FIG. 2 is a scanning electron micrograph of one surface of the sheet of FIG. 1 subjected to a conventional heat treatment for 20 hours;

FIG. 3 is a scanning electron micrograph of the surface of the sheet of FIG. 2 after 60 hours of the conventional heat treatment;

DETAILED DESCRIPTION OF THE INVENTION

Figure 4:
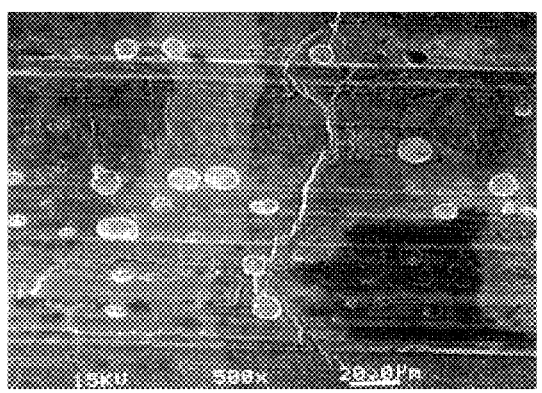
FIG. 4 is a scanning electron micrograph of one surface of the sheet of FIG. 1 subjected to a heat treatment according to the present invention for 20 hours.

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention includes a method of treating a surface of a stacked aluminum ingot during a heating process. Aluminum alloy ingots are typically stacked on top of each other in a preheat furnace which reaches temperatures less than the melting point of the aluminum alloy, e.g., about 200–600° C. The ingots are maintained spaced apart by a plurality of spacer blocks which may be formed from various materials including ceramics, aluminum alloys, titanium alloys, steel alloys, nickel alloys and combinations thereof. Preferred materials for the spacer block are ceramics, ceramic composites and metal laminated ceramics such as ceramic structures laminated with a metal.

The preheating process causes alkali metals and alkaline earth metals (e.g., magnesium) in the aluminum alloy to migrate to the surfaces of the ingot and react with available elements in the furnace atmosphere such as oxygen or fluorine. The present invention is particularly suited for use in a preheat furnace having an atmosphere containing volatilized ammonium fluoroborate ($NH_4BF_4$). Ammonium fluoroborate sublimes at about 240° C. which is less than the operating temperature of a typical aluminum alloy ingot preheat furnace. Magnesium present at the ingot surfaces reacts with the fluorine in $NH_4BF_4$ to form a thin, smooth bi-layer coating having a frosty, white appearance. This coating includes an outermost layer of magnesium oxide/hydroxide and a layer of magnesium oxyfluoride adjacent the ingot surface. In the location of the spacer blocks, the $NH_4BF_4$ cannot reach the aluminum ingot and the frosty, white coating cannot be formed.

According to the present invention, a fluorine containing material is applied to the interface between the aluminum ingots and the spacer blocks so that alkali metals or alkaline earth metals such as magnesium which migrate to the surfaces of the ingots during the preheating treatment may bind with fluorine. In this manner, the portion of the ingot surfaces not contacted by a spacer block are treated with $NH_4BF_4$, while the portion of the ingot surfaces that are covered by a spacer block are treated with another fluorine containing material such that the entire surface of the ingot is treated with fluorine.

The interface between an aluminum ingot and a spacer block is treated by applying a treating composition containing fluorine to at least one of (i) a contact surface of the aluminum ingot which contacts a spacer block and (ii) a support surface of the spacer block which contacts the ingot. The surface of the spacer block which contacts the ingot is referred to as the support surface and supports the ingot from the underside of the ingot or contacts an upper side of the ingot. Preferably, the treating composition is applied to the support surface of the spacer block. In a stack of ingots, opposing sides of each spacer block used to maintain the ingots spaced apart in a preheat furnace are treated according to the present invention. By applying the treating composition to the spacer blocks, the spacer blocks may be repositioned within a stack yet ensure that the interface between the spacer blocks and the ingots includes the treating composition. However, it is also possible to apply the treating composition to a portion of the surface of the ingots or the entire ingot surface. The treating composition may be applied to the spacer blocks or ingots in a dry form or via brushing, spraying, dipping, or rolling when suspended or dissolved in a solvent, binder, surfactant or dispersant. Suitable solvents include water and alcohols. Suitable binders include paints, lacquers and shellacs. Alternatively, the treating composition may be incorporated into a laminating foil, sheet or thin film applied to the spacer blocks. It is also possible to incorporate the treating composition in the surface of the spacer blocks during manufacture of the spacer blocks.

The treating composition contains a fluorine containing material that decomposes or vaporizes at a temperature below the operating temperature of the furnace. Upon decomposition or vaporization of the fluorine containing material, alkali metals and/or alkaline earth metals in the aluminum alloy which migrate from the bulk of the ingots to the ingot/spacer block interfaces, react in part with the fluorine to form a fluorine coating on the ingot surfaces. Ingots subjected to the method of the present invention may be rolled, conversion coated and/or further coated with polymers according to conventional practices.

Suitable inorganic fluorine containing materials include aluminum fluoride, ammonium bifluoride, ammonium fluoroborate, ammonium fluoride, calcium fluoride, sodium aluminum fluoride, magnesium fluoride, magnesium hexafluorosilicate, potassium fluoride, sodium fluoride sodium bifluoride and sodium hexafluorosilicate. A preferred inorganic fluorine containing material is potassium fluoride.

Suitable organic fluorine containing materials include polytetrafluoroethylene ("PTFE"), tetrafluoroethylene-hexafluoropropylene, tetrafluoroethylene-perfluoro (alkylvinyl ether), tetrafluoroethylene-ethylene, polyvinylidene fluoride, vinylidene fluoride-hexafluoropropylene, vinylidene fluoride-1-H-pentafluoropropylene, polyvinyl fluoride, tetrafluoroethylene-perfluoroethylene sulfonic acid, fluorinated ethylene propylene (e.g., tetrafluoroethylene- propylene), ethylene-chlorotrifluoroethylene and perfluoroalkoxy copolymers. A preferred organic fluorine containing material is PTFE. A suitable treating composition containing PTFE is KRYTOX® from E. I. du Pont de Nemours and Company. Commercially available fluoropolymers which may be used in the present invention include TEFLON®, NAFRON®, TEDLAR®, Technoflon SL, VITON®, KALREZ®, KYNAR®, and Aflon COP.

Aluminum alloys which are treatable according to the present invention include Aluminum Association alloys of the 1XXX, 2XXX, 3XXX, 4XXX, 5XXX, 6XXX, 7XXX or 8XXX series as well as other registered and unregistered cast, forged, extruded and wrought alloys.

Although the invention has been described generally above, the particular examples give additional illustration of the product and process steps typical of the present invention.

EXAMPLES

A dispersion of PTFE was applied to one side of a calcium silicate spacer block. An as-rolled sheet of pristine alloy AA 5182 was positioned between the PTFE treated side of the spacer block and an untreated spacer block. The stack of spacer blocks sandwiching the aluminum sheet was heated to 500° C. in a furnace having an air atmosphere and held for 20 hours and 60 hours. Depth profiles of surface reaction products was measured by Auger electron spectroscopy (AES) for the as-rolled sheet and the heated sheet at the treated and untreated interfaces. The AES data and appearance of the sheet before and after heat treatment is set forth in Table 1.

An ingot of AA 5182 was heat treated for 10 hours to 500° C. in a production plant furnace having. an air atmosphere containing volatilized ammonium fluoroborate. Depth profiles of surface reaction products of the ingot was measured by AES and appearance of the ingot is included as sample 6 in Table 1.

TABLE 1

| Sample | Heat treatment | Depth of magnesium hydroxide/oxide layer (Å) | Depth of magnesium oxyflouride layer (Å) | Appearance |
|---|---|---|---|---|
| 1 | None | ~50 | 0 | Bright silver |
| 2 | Untreated interface 20 hr | >10,000 | 0 | Dark brown stain |
| 3 | Untreated interface 60 hr | >10,000 | 0 | Dark brown stain |
| 4 | Treated interface 20 hr | ~1100 | ~550–1350 | Frosty silver (no stain) |
| 5 | Treated interface 60 hr | ~1500 | ~800–1600 | Frosty silver (no stain) |
| 6 (Ingot) | Exposed to $NH_4FB_4$ | ~1200 | ~700–1950 | Frosty silver |

The surfaces of the sheet which were positioned adjacent an untreated spacer block (samples 2 and 3) had an unacceptably thick layer of oxide, over 10,000 Å thick, and exhibited a dark brown stain from the thick oxide layer. In contrast, the surfaces of the samples which were positioned adjacent the spacer block with PITFE (samples 4 and 5) had oxide thicknesses similar to that of the portion of the control benchmark sample exposed to the ammonium fluoroborate atmosphere, i.e. about 1100–1500 Å thick. The PTFE treated samples also had similar, acceptable appearances to the fluoroborate treated ingot.

Figure 5:
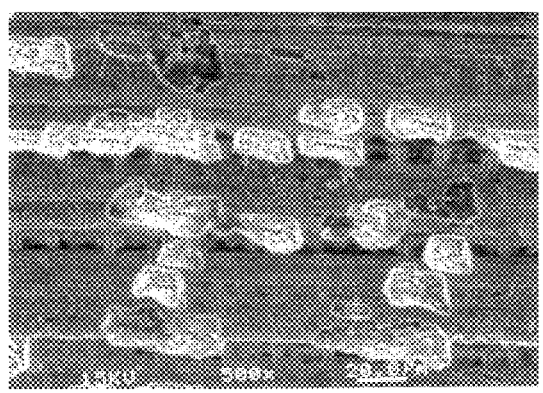
FIG. 5 is a scanning electron micrograph of the surface of the sheet of FIG. 4 after 60 hours of the heat treatment of the present invention.

FIGS. 1–5 are scanning electron micrographs at 500 times magnification of the surfaces of samples 1–5 listed in Table 1. FIG. 1 shows the aluminum sheet as being bright silver in color with longitudinal roll markings. The area of the sheet not treated according to the present invention shown in FIGS. 2 and 3 has loosely packed porous, rough surface structures. These structures scatter nearly all wavelengths of visible light causing the surface to appear dark. This dark color is unacceptable for many commercial applications. The surface morphology of the sheets treated according to the present invention shown in FIGS. 4 and 5 is significantly different from that of the untreated sheets of FIGS 2 and 3. Bright white areas are shown which provide the sheet with an acceptable frosty appearance. These tests were performed on sheets for convenience of handling. Treatment of the interface between ingots and spacer blocks is believed to produce similar results.

Aluminum alloy ingots subjected to a heat treatment according to the present invention result in a bright white color at the location of the interface between the ingots and spacer blocks which is similar in appearance to the surfaces of the ingots not contacted by the spacer blocks but exposed to a $NH_4BF_4$ atmosphere. The heat treated ingots have a uniform appearance which is desirable for many commercial uses of aluminum alloy sheet. This process reduces waste by avoiding the need to scalp or edge trim stained areas and minimizes sensitivity to varying levels of magnesium in aluminum alloys. The process is readily implemented at the point of use (in preheat furnace) or at the manufacturing site for the spacer blocks.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method of treating a surface of a stacked aluminum alloy ingot during a heating process comprising the steps of:
   positioning a spacer member adjacent an aluminum alloy ingot to form a stack, wherein the spacer member comprises a support surface contacting a contact surface of the aluminum alloy ingot, and at least one of the support surface and the contact surface comprises a fluorine containing material; and
   heating the stack to at least a temperature at which the fluorine containing material decomposes or vaporizes and an alloying metal in the aluminum alloy ingot migrates to the contact surface such that a layer of a fluorinated oxide of the metal forms on the contact surface.

2. The method of claim 1 wherein an alloying metal in the aluminum alloy ingot is an alkali metal or an alkaline earth metal.

3. The method of claim 2 wherein the alloying metal is magnesium.

4. The method of claim 1 wherein the support surface is coated with the fluorine containing material.

5. The method of claim 1 wherein the spacer member comprises ceramic, aluminum alloy, titanium alloy, steel alloy or nickel alloy.

6. The method of claim 5 wherein the spacer member comprises ceramic or aluminum alloy or both.

7. The method of claim 1 wherein the fluorine containing material is selected from the group consisting of polytetrafluoroethylene, tetrafluoroethylene-hexafluoropropylene, tetrafluoroethylene-perfluoro (alkylvinyl ether), tetrafluoroethylene-ethylene, polyvinylidene fluoride, vinylidene fluoride-hexafluoropropylene, vinylidene fluoride-1-H-pentafluoropropylene, polyvinyl fluoride, tetrafluoroethylene-perfluoroethylene sulfonic acid, fluorinated ethylene propylene, ethylene-chlorotrifluoroethylene perfluoroalkoxy copolymers, aluminum fluoride, aluminum bifluoride, ammonium fluoroborate, ammonium fluoride, sodium aluminum fluoride, calcium fluoride, magnesium fluoride, magnesium hexafluorosilicate, potassium fluoride, sodium fluoride, sodium bifluoride and sodium hexafluorosilicate.

8. The method of claim 7 wherein the fluorine containing material comprises polytetrafluoroethylene or potassium fluoride.

9. The method of claim 1 further comprising an initial step of applying a treating composition comprising the fluorine containing material onto the support surface or the contact surface by brushing, spraying, dipping, or rolling.

10. The method of claim 9 wherein the treating composition comprises a solvent, binder, surfactant or dispersant.

11. The method of claim 1 wherein the temperature at which the fluorine containing material decomposes or vaporizes is less than the melting point of the aluminum alloy.

12. The method of claim 1 further comprising stacking a plurality of aluminum ingots with a spacer member positioned between each of the ingots wherein each said spacer member comprises a support surface contacting a contact surface of an ingot, and at least one of each adjacent support surface and contact surface is coated with a fluorine containing material.

13. The method of claim 1 wherein the aluminum ingot comprises an AA 1XXX, 2XXX, 3XXX, 4XXX, 5XXX, 6XXX, 7XXX or 8XXX series alloy.

* * * * *